(12) United States Patent
Chakmakjian et al.

(10) Patent No.: US 7,918,583 B2
(45) Date of Patent: Apr. 5, 2011

(54) ILLUMINATION DEVICES

(75) Inventors: Stephen H. Chakmakjian, Honeoye Falls, NY (US); Donald J. Schertler, Rochester, NY (US); Tasso Sales, Rochester, NY (US); G. Michael Morris, Victor, NY (US)

(73) Assignee: RPC Photonics, Inc., Rochester, NY (US)

( * ) Notice: Subject to any disclaimer, the term of this patent is extended or adjusted under 35 U.S.C. 154(b) by 449 days.

(21) Appl. No.: 11/505,110

(22) Filed: Aug. 16, 2006

(65) Prior Publication Data

US 2008/0043466 A1    Feb. 21, 2008

(51) Int. Cl.
*F21V 11/00* (2006.01)

(52) U.S. Cl. ........ 362/240; 362/244; 362/237; 362/334; 362/335

(58) Field of Classification Search .......... 362/240, 362/237, 244, 555, 558, 338, 340
See application file for complete search history.

(56) References Cited

U.S. PATENT DOCUMENTS

| | | | |
|---|---|---|---|
| 2,215,900 A | 9/1940 | Bitner | |
| 2,254,961 A | 9/1941 | Harris | |
| 4,207,607 A | 6/1980 | Gulliksen | |
| 5,704,709 A * | 1/1998 | Zwick et al. | 362/304 |
| 6,547,423 B2 | 4/2003 | Marshall et al. | |
| 6,819,505 B1 | 11/2004 | Cassarly et al. | |
| 6,859,326 B2 | 2/2005 | Sales | |
| 7,033,736 B2 | 4/2006 | Morris et al. | |
| 7,207,700 B2 * | 4/2007 | Fallahi et al. | 362/334 |
| 7,217,004 B2 * | 5/2007 | Park et al. | 362/240 |
| 7,249,878 B2 * | 7/2007 | Patton et al. | 362/558 |
| 7,364,336 B2 * | 4/2008 | Mori et al. | 362/560 |
| 2004/0114393 A1 | 6/2004 | Galli | |
| 2005/0265035 A1 * | 12/2005 | Brass et al. | 362/451 |
| 2006/0077692 A1 * | 4/2006 | Noh et al. | 362/625 |
| 2006/0209562 A1 * | 9/2006 | Lee et al. | 362/606 |
| 2006/0221611 A1 * | 10/2006 | Noh et al. | 362/247 |
| 2006/0279945 A1 * | 12/2006 | Hasei et al. | 362/97 |

FOREIGN PATENT DOCUMENTS

GB    2 089 956    6/1982

OTHER PUBLICATIONS

OptiLED- Shaping the Future of Light, Website at http://www.optiled.biz/products/products.html.

* cited by examiner

*Primary Examiner* — Evan Dzierzynski
(74) *Attorney, Agent, or Firm* — Kenneth J. Lukacher

(57) ABSTRACT

Lighting devices are provided for efficiently distributing light over an area to provided uniform illumination over a wide angle or other tailored illumination patterns. Each light device has at least one light source, at least one collimator for partially collimating light from the light source, and at least one diffuser for diffusing light from the collimator. The diffuser provides diffused light over an area from the diffuser having an intensity that is angularly dependent in accordance with the angular distribution intensity of light outputted from the collimator, so as to provide a predetermined illumination pattern from the device. The light sources and collimators may be provided in one or two-dimensional arrays, and a single diffuser may be formed on each collimator or the diffuser may be along a plate spaced from the collimators.

48 Claims, 12 Drawing Sheets

ILLUMINATION DEVICES

FIELD OF THE INVENTION

The invention relates to illumination devices, often called luminaires, and in particular to illumination devices using small light sources, such as light-emitting diodes (LEDs) or the like, for the efficient and controlled illumination of a desired area. The illumination devices of the present invention may be utilized for general-purpose lighting in and around homes and commercial buildings, and may also be used in architectural and industrial lighting applications.

BACKGROUND OF THE INVENTION

Devices have been developed for collecting and collimating light from a small light source, such as an incandescent, LED, or the like. Often such devices use a reflective parabolic structure which are designed to collimate the light from a point source placed at the focus of the reflector due to the divergent nature of the light source. The light striking the structure is redirected parallel to the axis of the parabola, exits out the open end of the reflector, and propagates as a narrow, well-confined beam. In practice the source is not a point, but has some spatial extent and, as a result, the actual divergence of this reflected beam is determined by the size of the reflector and by the finite, i.e., non-zero, size of the source. Also, the quality of the beam of light in the far field is poor, forming a ring structure caused by the base of the reflector being blocked by the light source. An additional drawback of reflective parabolic structure designs is that the light from the source which does not strike the reflector propagates out the open end of the reflector un-collimated. To correct these issues, some designs, such as those often used in flashlights, incorporate a lens element at the open end of the reflector. The lens captures both the direct light from the source and the light from the reflector. If the lens is made to collimate the direct light then it will cause the reflected light to be highly divergent. Since true collimation of all the light from such an arrangement cannot be achieved, such designs compromise between the divergence of the light and the uniformity of the resulting beam.

Catadioptric designs incorporating both reflection and refraction in a single optical component have been proposed which often operate by total-internal-reflection (TIR) using parabolic or conical wall structures. For example, Bittner in U.S. Pat. No. 2,215,900 describes a multi-surfaced rotationally-symmetric optical element with aspheric surfaces and a recess or cavity on one side for positioning the light source, such as a small flashlight bulb. Marshall et al., U.S. Pat. No. 6,547,423 describes a rotationally symmetrical, bowl shaped collector lens formed from a single material with an indentation in the bottom a light source. In U.S. Pat. No. 6,819,505, Cassarly et al. has a similar design as a collector of the light from the source, but it does not collimate the light. Instead, it transmits the light from a collector portion through a transition section to a projector lens. The collector portion substantially focuses the light within the transition section to produce a substantially circular light distribution. The light is then refracted by the projector lens section to produce a highly collimated beam.

These designs work to produce a fairly well collimated beam of light from a small light source. This limits their use for general lighting applications without the use of some diffuser or other light control device. Although diffusers have been used to smooth light over an area in general lighting applications, such as diffusing panel for fluorescent light, or diffusing surfaces in incandescent lighting fixtures, they have not been adapted to work with small divergent light sources, such as LEDs. However, passing light such a small divergent light source collimated as described in the above cited patents through a typical general lighting diffuser will provide poor results since the collimation needed to efficient collect light from the source will cause non-uniform light patterns having undesirable bright spot(s). It is thus desirable to use collimated light from low power light sources, such as LEDs, in general lighting applications by combining with a diffuser designed to provide uniform light over a desired angle that can also be used in tailored lighting applications, such as in architectural and industrial lighting.

SUMMARY OF THE INVENTION

Accordingly, it is one object of the present invention to provide lighting devices that utilize small, wide-angle light sources, such as an LEDs, in combination with a collimating and diffusing optics to provided substantially uniform light suitable for general light applications that can also be used to provided other tailored illumination patterns.

It is another object of the present invention to provide lighting devices for general lighting application using a high efficiency diffuser element and low power light sources.

It is still a further object of the present invention to provide lighting devices utilizing one or two dimensional arrays of small, wide-angle light sources that can produce a light distribution pattern that is substantially uniform over a prescribed region of space.

It is another object of the present invention to provide a low profile luminare having a housing with an array of collimators for collimating light from such small, wide-angle light sources in which the diffuser represents one of multiple diffusers interchangeable in such housing to provide luminares producing different illumination patterns.

Briefly described, the present invention embodies a lighting device having at least one wide-angle light source, such as an LED, at least one collimator for partially collimating light from the light source to provide angular distribution intensity narrower than the light source, and at least one diffuser for diffusing light from the collimator. The diffuser has an optical diffusion property providing over an area an angularly dependent output light intensity in accordance with the angular distribution intensity of the light from the collimator so as to provide a predetermined illumination pattern from the diffuser.

The angular distribution intensity of the collimator may be considered as having collimated bright central portion and non-collimated light portions at decreasing light intensity at increasing angles from the central portion. To provide substantially uniform area illumination from the light device over an angle, the diffuser provides an angularly dependent output light intensity complementary to the angular distribution intensity of the partially collimated light from the collimator.

Preferably the collimator has a parabolic body having a flat light exiting end and a light entering end with a cavity having spherical side surfaces and a center portion having a hyperbolic or ellipsoidal shape, and a parabolic outer surface. The light source is centrally disposed at the entrance of the cavity. The parabolic outer surface total internally reflects light received via the spherical sides of the cavity toward the light exiting end, in which light received by the center portion is collimated toward the light exiting end. The parabolic is rotationally symmetric, but may also be linearly symmetric. The cavity is preferably filled with air, but may be filled with material having an index of refraction effecting the shape of the collimator body. Other optics for collimating light from a wide-angle light source to the diffuser may also be used.

The diffuser has a randomized microlens structure as described in U.S. Pat. No. 6,859,326 or U.S. Pat. No. 7,033,736, which are herein incorporated by reference, to provide the desired predetermined illumination pattern over an area from the partially collimated light from the collimator. The microlens structure of the diffuser may be formed, such as molded, in the material at the light exiting end of the collimator, or along the surface of a plate spaced from the collimator.

Lighting devices are provided having a single collimator and diffuser, or multiple light sources to a one or two-dimensional array of collimators having either an integrated diffuser, or a diffuser spaced from the light exit end of the collimators. Such collimators may be mounted to a board supporting the electronics of the light sources in which the collimators have flat base or extending collar ring or posts for mounting the collimators to the board.

One example of a light device of the present invention is a low profile luminare lighting device having a housing with an arrays of collimators for collimating light from small, wide-angle light sources with one of multiple interchangeable diffusers to produce luminares producing different illumination patterns. Optionally, the collimator and diffuser may be integrated into a single, monolithic, structure.

The invention addresses the need to make the most efficient use of light from a given light source and to substantially distribute the light over a specified region of space. The versatility of this invention is that a single source-collimator arrangement can be used for a variety of applications. One need only replace the diffuser to meet the needs of the task.

DETAILED DESCRIPTION OF THE DRAWINGS

The foregoing objects, features and advantages of the invention will become more apparent from a reading of the following description in connection with the accompanying drawings, in which.

Figure 14A:
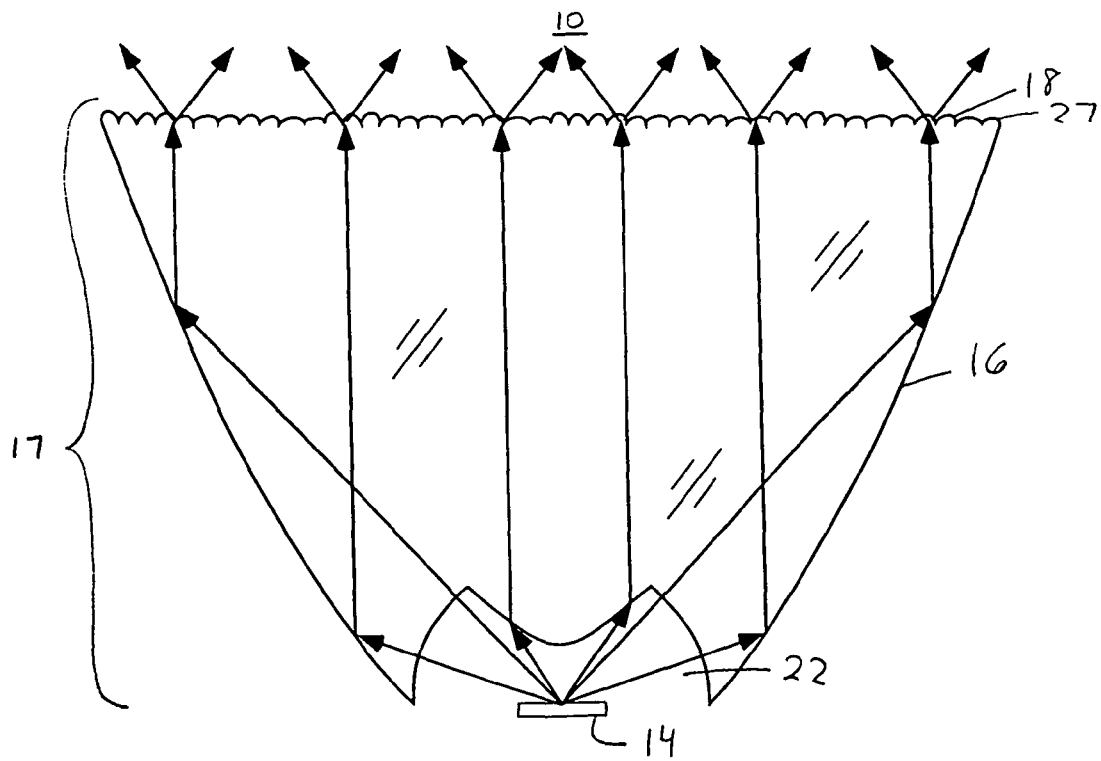
FIG. 14A is an optical ray diagram showing a diffuser integrated into the material of the collimator of FIGS. 2 and 3.
Figure 17:
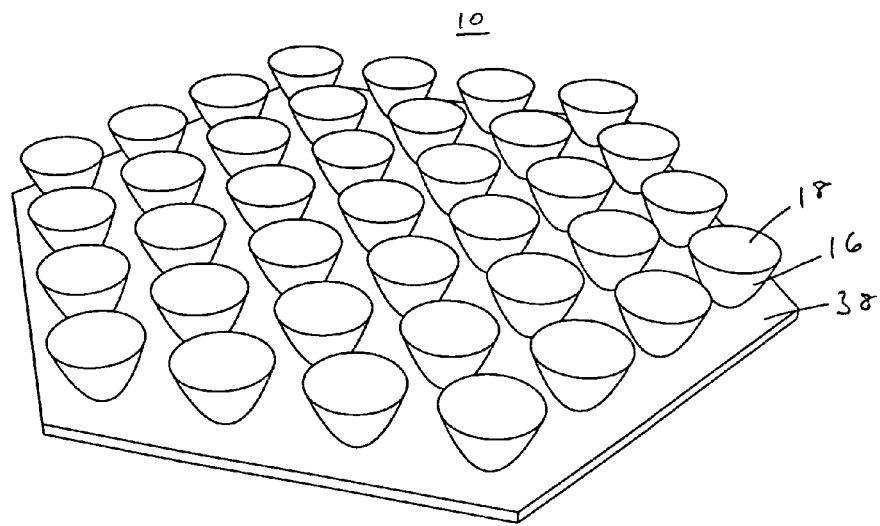
Figure 18A:
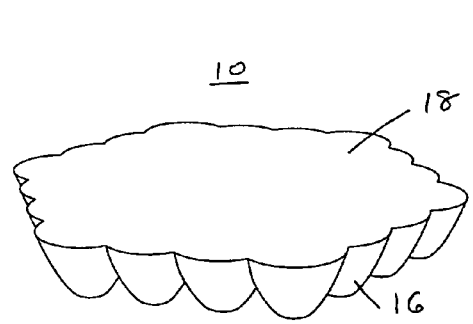
Figure 18B:
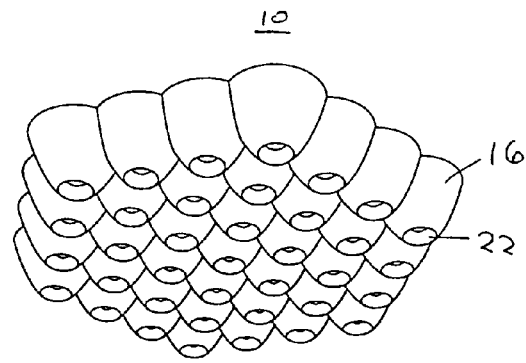

FIG. 17 is a perspective view of another example of the lighting device of the present invention having a two-dimensional array of individual collimator-diffuser assemblies of FIG. 14A in which a diffuser integrated at the top surface of each collimator as illustrated in FIG. 14A; and FIGS. 18A and 18B are top and bottom perspective view of another example of the lighting device of the present invention shown without light sources having a polygon two-dimensional array of collimators provided in a single monolithic structure, and the diffuser is integrated into the top surface of such monolithic structure.

DETAILED DESCRIPTION OF THE INVENTION

Figure 1:
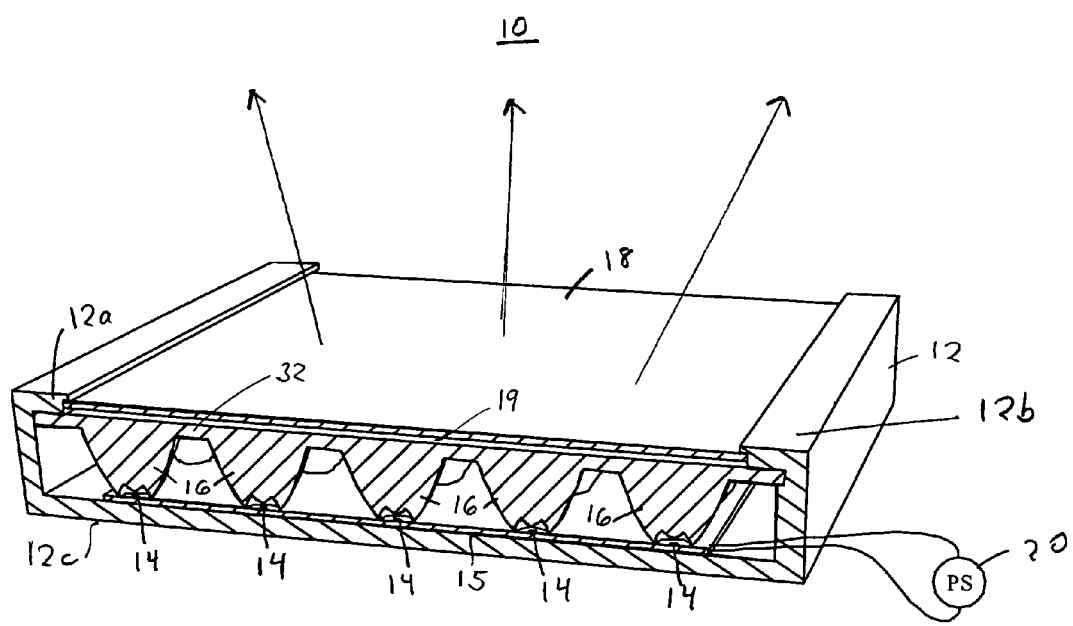
FIG. 1 is a perspective view of one example of a lighting device of the present invention in which part of the luminaire housing is cut away.

Referring to FIG. 1, one example of a lighting device 10 of the present invention is shown enclosed in a housing 12. The lighting device 10 has multiple wide angle light sources 14, such as LEDs, mounted on a circuit board 15 which are disposed to provide light to a two-dimensional array of parabolic shaped collimators 16 disposed along interior of the housing. The collimators 16 each partially collimates the light for each of their respective light sources 14, and provides such partially collimated light to a diffuser 18 spaced by a gap 19 from the array of collimators. Partially collimated light represents light having an angular distribution intensity narrower than the light source 14, and may particularly refer to light having an angular distribution intensity with collimated or bright central portion and non-collimated light portions of decreasing light intensity at increasing angles, e.g., ±10°, from the central portion (see, examples of collimator distribution intensity of FIG. 5 or 11). Even with such non-collimated light portions, the light rays incident surface 27 at top end 16b and exiting each collimator 16 from both reflected light from the collimator's parabolic outer surface 24 between ends 16a and 16b, and from the light received via the collimator's central portion 26 are substantially parallel to each other, such as shown in FIG. 3, 6-8, or 14B-C. Since each collimator 16 need only provide partially collimated light, the collimator may be smaller in size than in contrast to a collimator element that provides more ideal or substantial collimation. In this example, the diffuser 18 represents a plate or sheet having a randomized microlens array on its surface facing the collimators 16. Such diffusing surface takes into account both the collimated light, and the non-collimated light at larger angles, outputted by each collimator 16 (see, for example, the diffuser's complementary diffusion property illustrated in FIG. 12). The microlens array structure of the diffuser 18 provides an intensity of the diffused light over an area that is angularly dependent in accordance with the angular distribution intensity of light outputted from each of the collimators 16, so as to provide a substantially uniform illumination or other predetermined illumination pattern over an area from the device 10, such as illustrated by the arrows in FIG. 1.

A power source 20 provides power to the light sources, which may be a battery, an external power source, and may include electronics typically used for powering light sources. Although the divergent light source 14 is described as a low power LED, other light sources may be used, such as a halogen bulb, OLED, laser (e.g., solid state laser source), or an optical fiber illuminated by a remote light source, such as a halogen, arc lamp, or solar. The housing may have flanges 12a and 12b each providing a slot, or other mechanically mounting means, such as a clamp or snapping features, along which diffuser 18 slides into to capture the diffuser in housing 12. The array of collimators 16 are shown as a monolithic structure, such as of molded optical material, to provide a common flange 32 (see FIG. 6) captured under flanges 12a and 12b. Optionally each collimator 16 of the array may be separate from each other and aligned and mounted over their respective light source. To provide different lighting devices 10 for different applications, the diffuser 18 may be interchangeable with one or more different diffusers via the slots defined by flanged 12a and 12b in housing 10, where different diffusers when located in the housing provide different area illumination patterns for the partially collimated light from the collimators 16.

The housing 12 may be mounted along surface 12c on a wall or ceiling providing a low profile device as the height of the collimators from board 15 may be, for example, between 1-40 mm, and the diffuser has a thickness, for example, of 0.5-3.0 mm, and the overall housing may be, for example, between 2-45 mm. Ventilation of heat from the light sources may be provided by slots or openings along the side walls of the housing, if needed. The housing 12 may also be recessed in a ceiling or wall depending on its particular application with sufficient ventilation of heat from the light sources, if needed. Other housings may also be used for supporting the light sources, collimators and diffuser, which may be of other polygonal shapes. For example, a light on a cellular phone or other portable device may have as part of its housing a compact collimator, e.g., 1-2 mm is height, and a thin diffuser plate, e.g., 0.5-1 mm, while larger housings may be used for flash lights, or general or architectural lighting. Other examples of lighting device 10 will be described later in connection with FIGS. 15A, 15B, 16A, 16B, 17, 18A and 18B.

Figure 2:
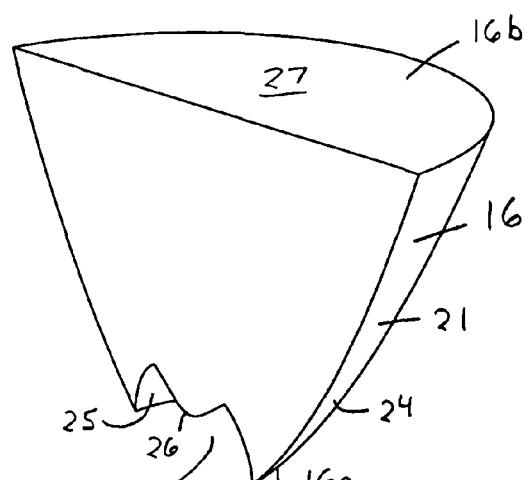
FIG. 2 is a perspective cut-away view of one of the collimators of the lighting device of FIG. 1.
Figure 3:
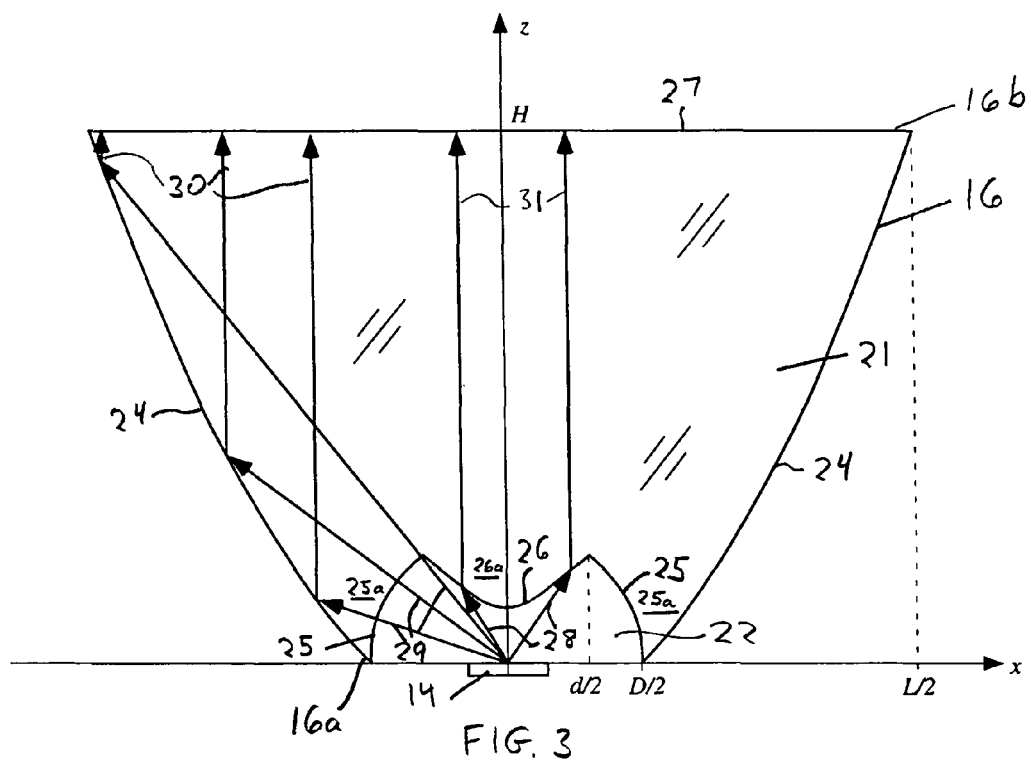
FIG. 3 is an optical ray diagram of the collimator of FIG. 2 with rays traced from an ideal point source at the origin.

A cut-way of one of the collimator 16 is shown in FIG. 2. The collimator 16 has a body 21 representing a single monolithic structure of a transparent optical material of refractive index n composed of four surface elements 24, 25, 26, and 27. For example, the optical material may be plastic, such as an acrylic, which may be molded to provide the desired shape of body 21. An LED or similar light source 14 sits at the bottom at the entranced to a cavity or recessed area 22, as shown in FIG. 3 at the base end 16a of body 21. The lower outer surface 24 of the body has a parabolic shape. The cavity 22 has an inner concave surface 25 which is spherical, and the surface 26 just above the source is hyperbolic. These surfaces 25 and 26 act to collimate the light from the source 14 and direct it toward the fourth surface 27 at the top end 16b of the body 21, as illustrated by rays 28 and 29, respectively. This fourth surface 27 may be smooth and flat, and acts to transmit the collimated beam of light toward the detached and interchangeable diffuser 18, or the diffuser 18 may represent a diffusing surface integrated directly onto the top surface 17 of the body 21, as described below. In either case, the diffuser 18 redistributes the collimated light into a wide range of desired shapes and profiles.

The optical design of the collimator 16 will now be described. Referring to FIG. 3, consider a point source positioned at the origin of the coordinate system shown sending light upward in the +z direction. Light emitted by the source strikes one of the two surfaces 25 or 26 comprising the air-filled recessed portion 22, of the spherical section 25a or the hyperbolic section or lens 26a. Light from the origin striking the spherical section hits the surface at normal incidence and is transmitted into the body 21 without experiencing any angular deflection due to refraction. The equation defining this spherical surface 25 of the device is $$z_S = \sqrt{(D/2)^2 - (x^2 + y^2)}, d/2 < \sqrt{(x^2 + y^2)} < D/2, \quad (1)$$

where D is the diameter of the sphere and d is the diameter of the center hyperbolic section. This light propagates through the material of the body 21 until it hits the parabolic surface 24 and experiences total internal reflection (TIR). The parabola has its focus at the origin. Therefore, since the light ray has a direct, straight-line path (as shown by rays 29) from the origin, the focus of the parabola, it is reflected by the parabolic surface 24 upward parallel to the axis of the collimator 16. Several such rays 30 are shown in the figure. The surface 24 of the parabola is given by the expression $$z_p = \frac{x^2 + y^2}{D} - \frac{D}{4}, D/2 < \sqrt{x^2 + y^2} < L/2, \quad (2)$$

where L is the diameter of the body 21.

Light from the point source that does not strike the spherical section 25a, hits the hyperbolic lens 26a just above the position of the light source 14. The function of the hyperbolic lens section is to collimate the light that would not otherwise strike the parabolic surface 24. The lens 26a also has its focus at the origin so that light from the point source (as shown by rays 28) striking surface 26 is refracted into the optical material of body 21 and travels upward parallel to the axis of the body. Two such rays 31 are shown in the figure. The equation for the lens surface 26 is given by $$\frac{(z-z_0)^2}{a^2} - \frac{x^2+y^2}{b^2} = 1, \sqrt{x^2+y^2} \le d/2, \quad (3)$$

where the variables a, b, and $z_0$ are given by $$a^2 = \frac{R_H^2}{(n^2-1)^2}, b^2 = \frac{R_H^2}{n^2-1}, z_0 = \frac{nR_H}{n^2-1}. \quad (4)$$

n is the refractive index of the optical material of body 21 and $R_H$ is the base radius of curvature of the hyperbola.

Just two quantities are needed to fully specify the geometry of the collimator 16: the diameter L of the collimator and the sphere diameter D. All other quantities are derived from them. The height of the parabola, H, between ends 16a and 16b is determined by knowing that the focus of the parabola is at the origin, and the surface passes through the point at z=H, x=D/2. Thus the expression for H is $$H = \frac{L^2}{4D} - \frac{D}{4}. \quad (5)$$

Or, alternatively, if H is known then the diameter L is given by $$L = D\sqrt{1 + \frac{4H}{D}}. \quad (6)$$

The diameter of the hyperbolic lens, d, is determined by the location of the ray that passes through the spherical section or surface 25 and strikes the top edge of the parabola surface 24 before being reflected vertically. The hyperbolic lens 26a collimates the light (shown by rays 28) from the source 14 that would not strike the parabola surface 24, and direct the light to surface 27 (as shown by rays 31). The inclusion of the hyperbolic lens 26a permits us to reduce the height of the collimator 16 while still providing the highest degree of collimation for all the light emitted by the source 14. The diameter d of the hyperbolic section 26a is given by $$d = D\frac{\sqrt{1+4H/D}}{1+2H/D}. \quad (7)$$

The final quantity to be specified is the base radius of curvature, $R_H$, of the hyperbola. As the height H of the body 21 increases, the angle subtended by the hyperbolic lens section 26a decreases and it is drawn away from the origin. Thus the radius will increase. The radius is determined by replacing z in Eq. (3) with the expression for $z_S$ in Eq. (1) when $\sqrt{x^2+y^2}=d/2$. The result yields $$R_H = -\frac{D}{2} + n\frac{DH}{D+2H} \quad (8)$$

This expression also gives a limiting relationship for H in terms of D, since $R_H$ cannot be negative. It is found that $$H \ge \frac{D}{2(n-1)}, \quad (9)$$

the equality resulting in $R_H$ equal to zero. The largest radius for the hyperbola is $$R_H = \frac{D}{2}(n-1), \quad (10)$$

for H>>D.

With a point source at the origin, this design offers perfect collimation of the light at the exit surface 27 of the body 21. An LED or other similar source 14 emits light over an extended area and will therefore degrade the degree of collimation. Ultimately, the final size of the collimator 16 will be determined by the size of the light source 14 and the degree of collimation that is desired.

The table below shows the amount of collimation that is achieved for several examples of collimator 16. In these examples, collimator 16 has a diameter D of 5 mm, is of a material having a refractive index of 1.5, and an LED source is centered at the origin with an area of 1 mm×1 mm. Simulations were performed using commercial raytracing software, such as ASAP sold by Breault Research Organization, Inc. of Tucson, Ariz., USA, to determine the full width at half maximum (FWHM) of the light exiting the unpatterned top surface 27 of the collimator 16. It was found that the larger the collimator 16 is relative to the size of the light source 14 the better the collimation.

| D (mm) | H (mm) | L (mm) | D (mm) | $R_H$ (mm) | Collimation FWHM |
|---|---|---|---|---|---|
| 5 | 40 | $5\sqrt{33}$ | $\frac{5\sqrt{33}}{17}$ | 1.029 | 2.7° |
| 5 | 20 | $5\sqrt{17}$ | $\frac{5\sqrt{17}}{9}$ | .833 | 4.4° |
| 5 | 10 | 15 | 3 | 0.5 | 6° |
| 5 | 5 | $5\sqrt{5}$ | $\frac{5\sqrt{5}}{3}$ | 0.0 | 8.5° |

Figure 4:
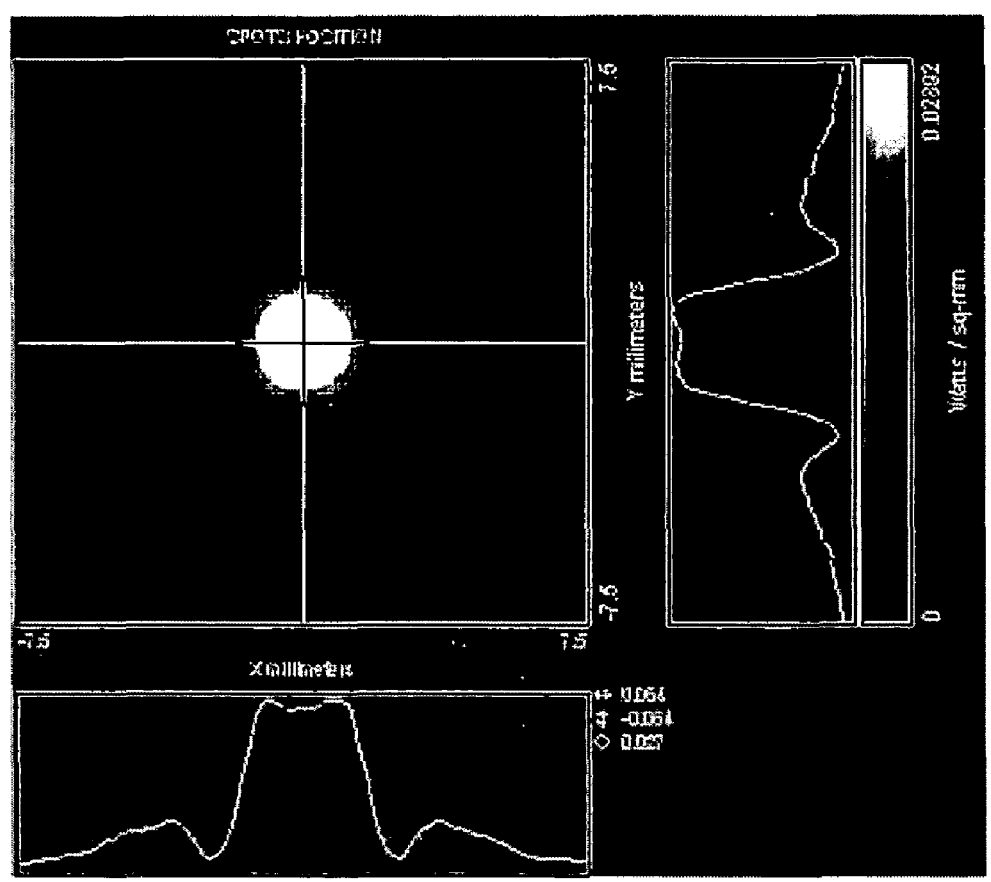
FIG. 4 is a plot of the light output distribution just above the top surface in an example of the collimator of FIGS. 2 and 3.
Figure 5:
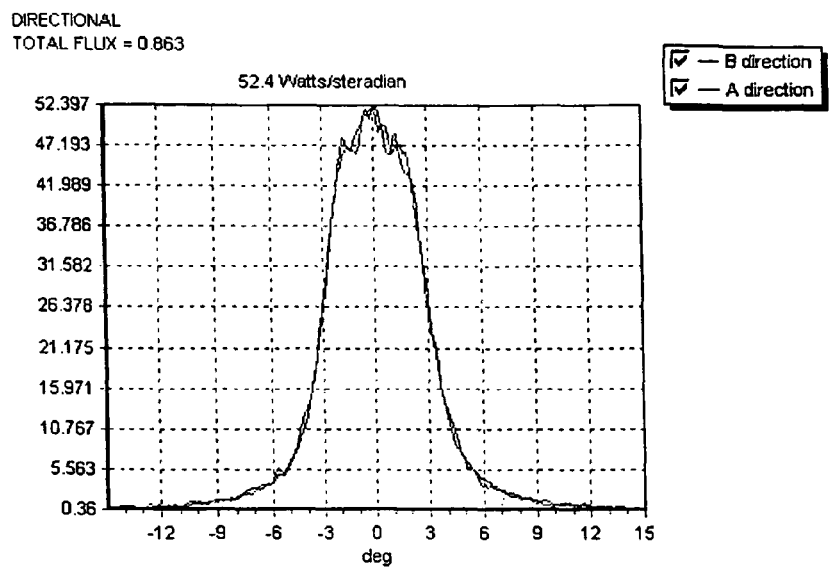
FIG. 5 is a graph of the angular light distribution just above the top surface in the same example of the collimator of FIGS. 2 and 3.

It is necessary to know the degree of collimation in order to design the diffuser 18 that is to be placed above the collimator 16 or integrated into the top surface 27 of the collimator in order to achieve the desired intensity distribution from the lighting device 10. In FIG. 4 the spatial light distribution is shown just above the top surface of the collimator 16 for the case of D=5 mm and H=10 mm and a refractive index of 1.5. The size of the frame is 15 mm×15 mm. In FIG. 5, the angular distribution of the light is shown in the horizontal and vertical directions from the same example. The full width at half max is 6°. The angular distribution intensity of the collimator 16 may be considered as having a collimated bright central portion and non-collimated light portions at decreasing light intensity at increasing angles along wings from the central portion. The examples in the table illustrate the relationship that the more collimated the light (i.e., at lower collimation FWHM), the larger the height, H, and length, L, of the collimator, needed.

Figure 6:
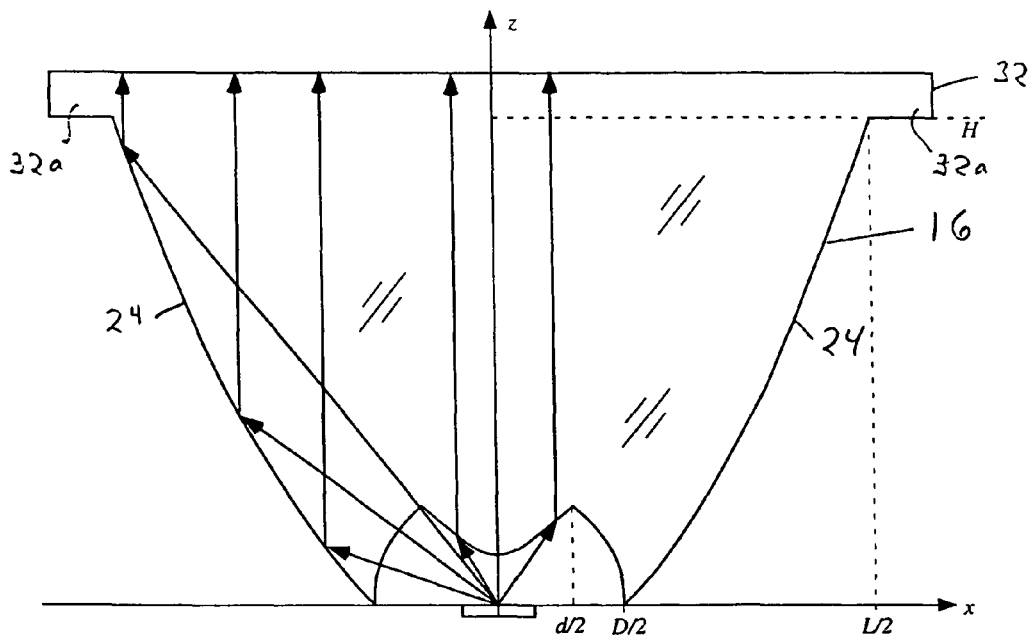
FIG. 6 is an optical ray diagram similar to FIG. 3 in which the top surface of the collimator is extended to allow for the formation of a mounting flange that extends outward beyond the parabolic surface.

The collimator 16 can be modified to accommodate a mounting surface 32 without loss in performance by extending the top surface 27 outward and increase the value of H beyond that required by Eq. (5). The extra height would be used to produce a flange 32a that extends out beyond the parabolic surface 24 of the collimator. An example is shown in FIG. 6. This mounting flange 32 is useful in providing, such as by molding, two or more collimators together as a monolithic unit, as shown for example in FIG. 1.

Figure 7:
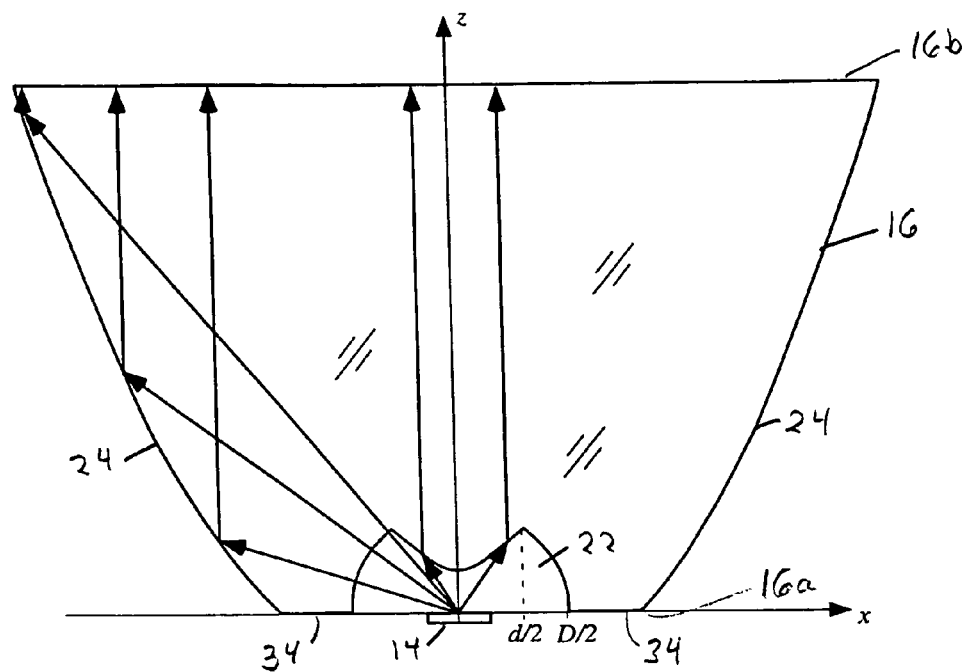
FIG. 7 is an optical ray diagram similar to FIG. 3 for an example of a collimator in which the base of its parabolic body is expanded to allow for a flat region to serve as a mounting surface.
Figure 8:
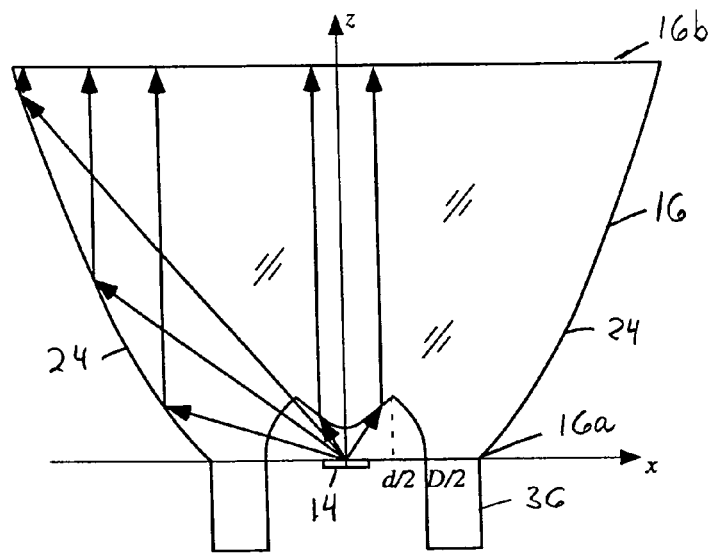
FIG. 8 is an optical ray diagram of the collimator similar to FIG. 3 for an example of a collimator in which the base of its parabolic body is expanded to allow for a collar ring or posts to serve as a mounting surface.

Another mounting surface 34 to the collimator 16 would be to increase the size of the parabolic surface 24 extending it outward thus increasing the diameter L and its focal length. This provides a transition region at the base end 16a of the collimator 16 between the recess 22 and the parabolic surface 24. This transition region could be a flat annulus mounting surface 34, as shown in FIG. 7, for mounting the collimator flush with the light source 14. Or the flat region could be extruded downward to form a mounting collar ring or a series of posts 36 for mounting the collimator 16 below the plane of the light source 14, as shown in FIG. 8. The performance of the parabolic surface 24 remains essentially unchanged since the light source 14 remains at its focus. The hyperbolic lens 26a diameter also has to increase to accommodate the increased diameter of the collimator 16.

Optionally, the recess 22 of the collimator 16 may be filled with an adhesive material to bond the collimator 16 to the light source 14 or to use the same material used to encapsulate the light source, such as is used for an LED die. In such case, a solution exists provided the index of the filling material is substantially different from the refractive index of the material that makes the collimator. If the index of the fill material 37a is $n_0$ and is less than the index of the collimator n, then the general solution form the shape of the hyperbolic lens surface 26a is of the form $$\frac{(z-z_0)^2}{a^2} - \frac{x^2+y^2}{b^2} = 1, \sqrt{x^2+y^2} \leq d/2, \quad (11)$$

where now the variables a, b, and $z_0$ are given by $$a^2 = \frac{R_H^2}{\left(\frac{n^2}{n_0^2}-1\right)^2}, b^2 = \frac{R_H^2}{\frac{n^2}{n_0^2}-1}, z_0 = \frac{\frac{n}{n_0}R_H}{\frac{n^2}{n_0^2}-1}. \quad (12)$$

The base radius of curvature of the hyperbola $R_H$ is now given by $$R_H = -\frac{D}{2} + \frac{n}{n_0}\frac{DH}{D+2H}. \quad (13)$$

For this expression to be valid it is required that the refractive index of the fill material obey the expression $$n_0 \leq \frac{n}{1+\frac{D}{2H}}. \quad (14)$$

Figure 9:
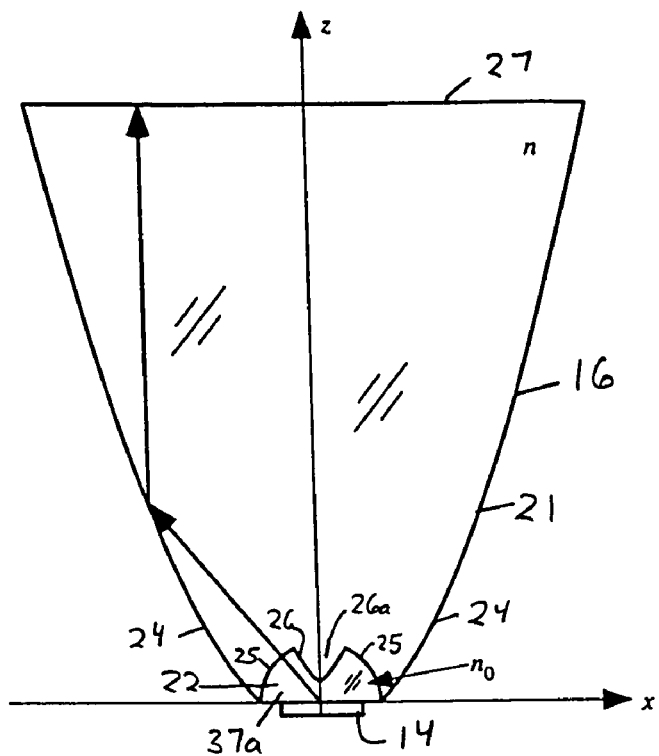
FIG. 9 is an optical ray diagram similar of the collimator to FIG. 3 with traced rays for the case of a filled cavity at the base of the collimator in which the index of the fill material, $n_0$, is lower than the index of the collimator, n.

As an example, for D=2 mm, H=10 mm, and a collimator with a 1.5 index, $n_0 \leq 1.36$. Choosing a value of 1.35 gives a base radius for the hyperbolic lens surface 26 of 0.01 mm. The basic shape of the collimator 16 is shown in FIG. 9. The shape of the hyperbolic lens component is determined by the difference in the indexes of the materials. Reducing the difference by adding a material other than air forces the lens to extend closer to the light source 14 and results in a smaller base radius of curvature. This is to maintain the optical power of the lens to perfectly collimate the light from a point source at the origin. But this reduces the collimation capability of the hyperbolic lens for the off-axis light emitted by the extended light source 14 and degrades the overall performance of the collimator.

If the index $n_0$ of the fill material 27b is greater than the index of the collimator 16 then a lens 26b is provided that is no longer hyperbolic but rather elliptical in shape and the expressions in Eqs. (11) and (12) are modified slightly to become $$\frac{(z-z_0)^2}{a^2} - \frac{x^2+y^2}{b^2} = 1, \sqrt{x^2+y^2} \leq d/2, \quad (15)$$

where now the variables a, b, and $z_0$ are given by $$a^2 = \frac{R_H^2}{\left(\frac{n^2}{n_0^2}-1\right)^2}, b^2 = -\frac{R_H^2}{\frac{n^2}{n_0^2}-1}, z_0 = \frac{\frac{n}{n_0}R_H}{\frac{n^2}{n_0^2}-1}. \quad (16)$$

$R_H$ is still given by Eq. (13) but now has a negative value. The restriction on $n_0$ is $$n_0 \geq n\left(\frac{D}{2H}+1\right). \quad (17)$$

Figure 10:
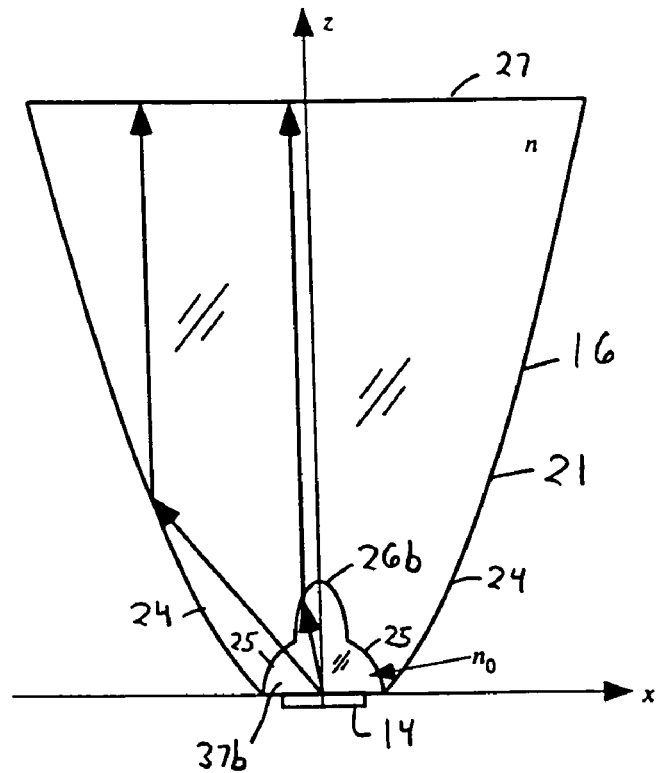
FIG. 10 is an optical ray diagram similar to FIG. 3 with traced rays for the case of a filled recess in which the index of the fill material, $n_0$, is larger than the index of the collimator, n.

For the example above with D=2 mm, H=10 mm, and a collimator with a 1.5 index, $n_0 \leq 1.65$. Choosing a value of 1.65 gives a base radius for the elliptical lens 26b of −0.174 mm. The shape of the collimator 16 for this example is depicted in FIG. 10.

With the use of the higher index material 27b on the source side of the collimator 16, there is a risk potential for total internal reflection at the interface between the collimator and the fill material 27b for light emitted from the off-axis area of the light source 14. This will result in stray light emerging from the sides of the collimator 16. Preferably, an air-gap in recess 22 of collimator 16 is provided to mitigate such stray light.

The collimator 16 of the lighting device 10 of the present invention is combined with diffuser 18 so that the light distribution can be controlled to meet the needs of a particular task or application. As an example, the diffuser 18 can redistribute the light into a uniform circular beam to illuminate a table or counter top. In another example, the diffuser 18 can produce a long narrow illumination for lighting a hallway or narrow walkway. As a further example, it can produce accent lighting for artwork. The diffuser 18 can be used to tailor the light from the collimator 16 and produce any arbitrary distribution of light. Consequently, many other applications for general purpose illumination can benefit from lighting device 10.

The optical design of the diffuser 18 will now be described. A surface structure that separates two media of distinct indices of refraction and incorporates randomized features generally operates as a diffuser element. Any diffuser structure that provides homogenization and distribution of light can be utilized with the present invention. Examples include diffusers surfaces such as those found in ground glass, microlens arrays, holographic recording of speckle, and diffractive elements. Even volume diffusers such as opal glass, for example, can be utilized in accordance with the present invention. Such diffusers, however, provide limited control of light and thus have narrow scope of applications. The preferred method for generating a diffuser is one that has an optical diffusion property providing an angular dependent output light intensity over an area such as described in earlier incorporated by reference U.S. Pat. Nos. 6,859,326 and 7,033,736. In summary, a diffuser produced in accordance with these patents provides an array of microlenses of different prescriptions which are iteratively determined such that the overall combined output of such microlenses provides the desired angular diffusion distribution. Thus, U shaped angular distributions (as in FIG. 12) or other distributions in accordance with the angular distribution of light from the collimator 16 can be provided.

Figure 11:
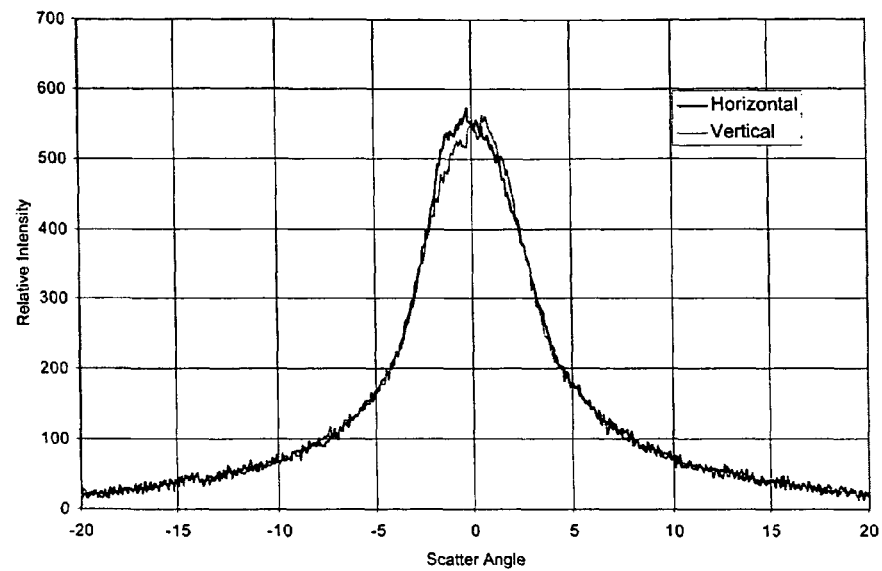
FIG. 11 is a graph of the measured angular output distribution of the intensity in an example of the collimator of FIGS. 2 and 3 collimating light from an LED source.
Figure 12:
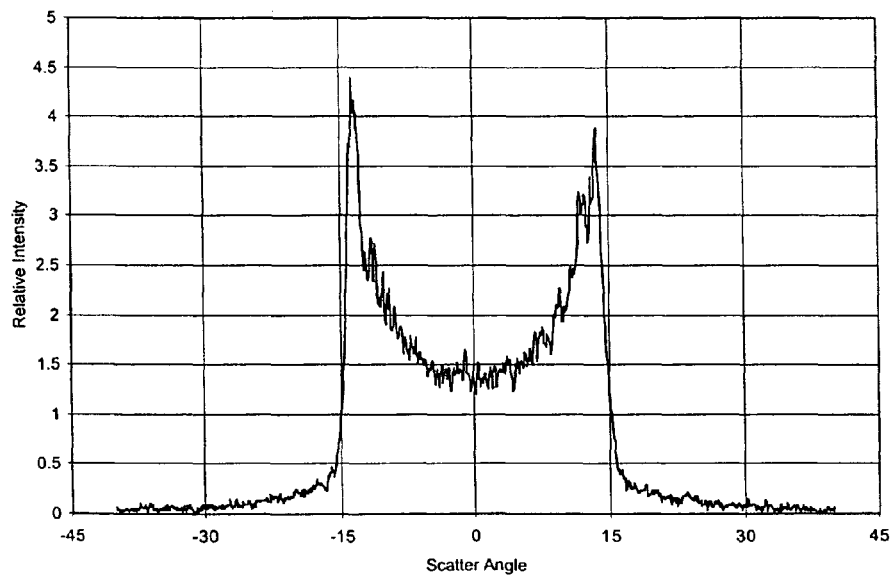
FIG. 12 is a graph of the angular output distribution of the intensity in an example of the diffuser of FIG. 1 when illuminated by a laser light source having a microlens array structure providing an angular dependent output intensity complementary to the of the collimator of FIG. 11.
Figure 13:
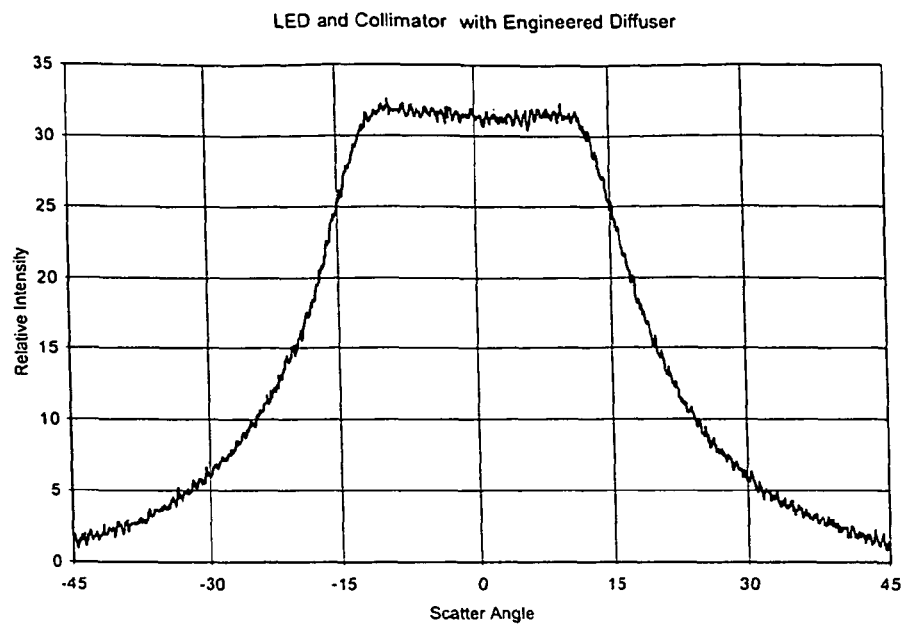
FIG. 13 is a graph of the angular output distribution of the intensity of light from an LED light source operated upon by the series of the collimator and diffuser, which provided graphs of FIGS. 11 and 12, respectively, to output substantially uniform area illumination over an angular range from the diffuser.

This enables these diffusers to compensate for the wings of non-collimated light in the angular distribution of the source collimation. As seen in the example of FIG. 5 there is still a certain amount of non-collimated light beyond 6°. For example, to provide a flat top intensity distribution the diffuser needs to compensate or account for this light. One such example is shown in the data plots of FIGS. 11, 12 and 13. The angular distribution of the light from a collimated Lambertian LED is shown in FIG. 11 which, in this example, shows a significant amount of light beyond 10°. To produce a flat top intensity distribution over an angular range of +/−10° a diffuser 18 is used which provides the scatter pattern shown in FIG. 12 when illuminated with a laser. Such a diffuser 18 can be made as described in the incorporated by reference patents. When combined with the collimated LED of FIG. 11 this diffuser produces the desired flat-top intensity distribution, which is substantially uniform over an angular range, as shown in FIG. 13. Other diffusers 18 may be used in the lighting device 10 having different angular distributions of light to provide different predetermined illumination patterns when illuminated with light from the collimator. For example, different diffusers 18 may having different angular ranges over which substantially uniform light may be provided in accordance with the incorporated patents.

Figure 14B:
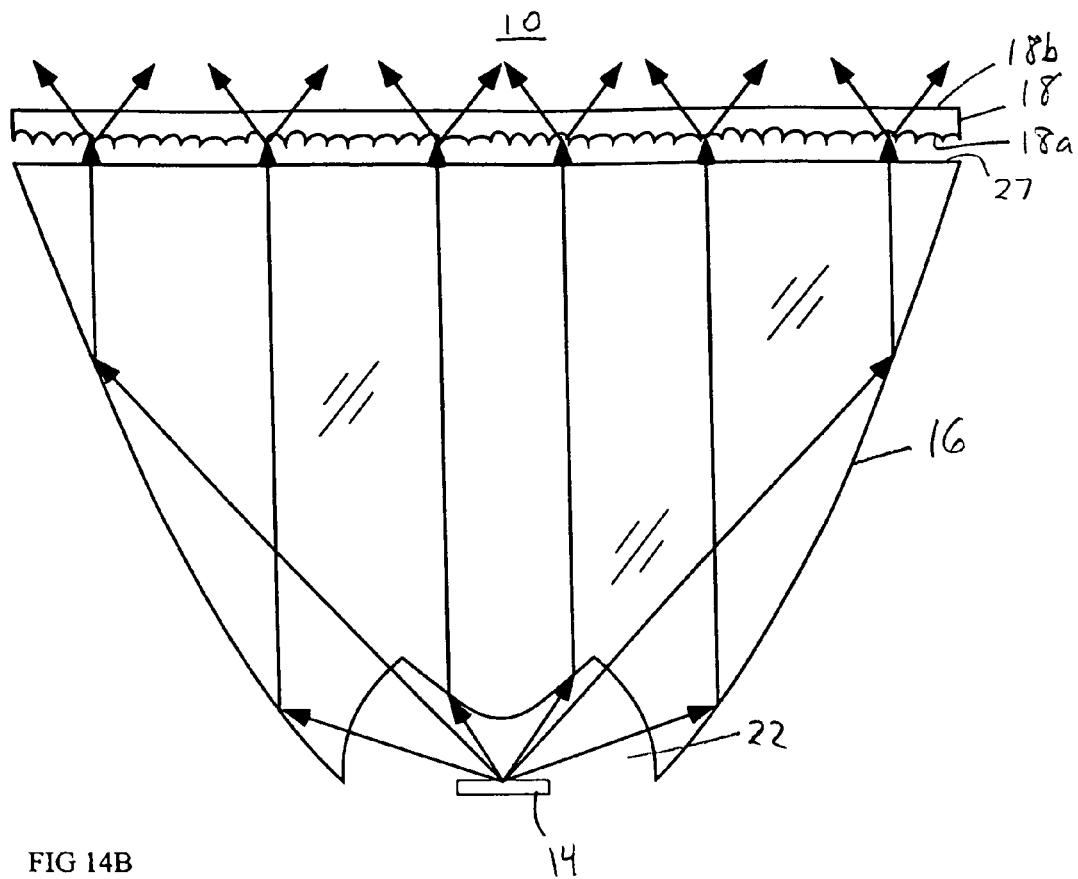
FIGS. 14B and 14C are optical ray diagram showing a diffuser spaced from the collimator of FIGS. 2 and 3 in which the diffusing surface of the diffuser faces the collimator in FIG. 14B and faces way from the collimator in FIG. 14C.
Figure 14C:
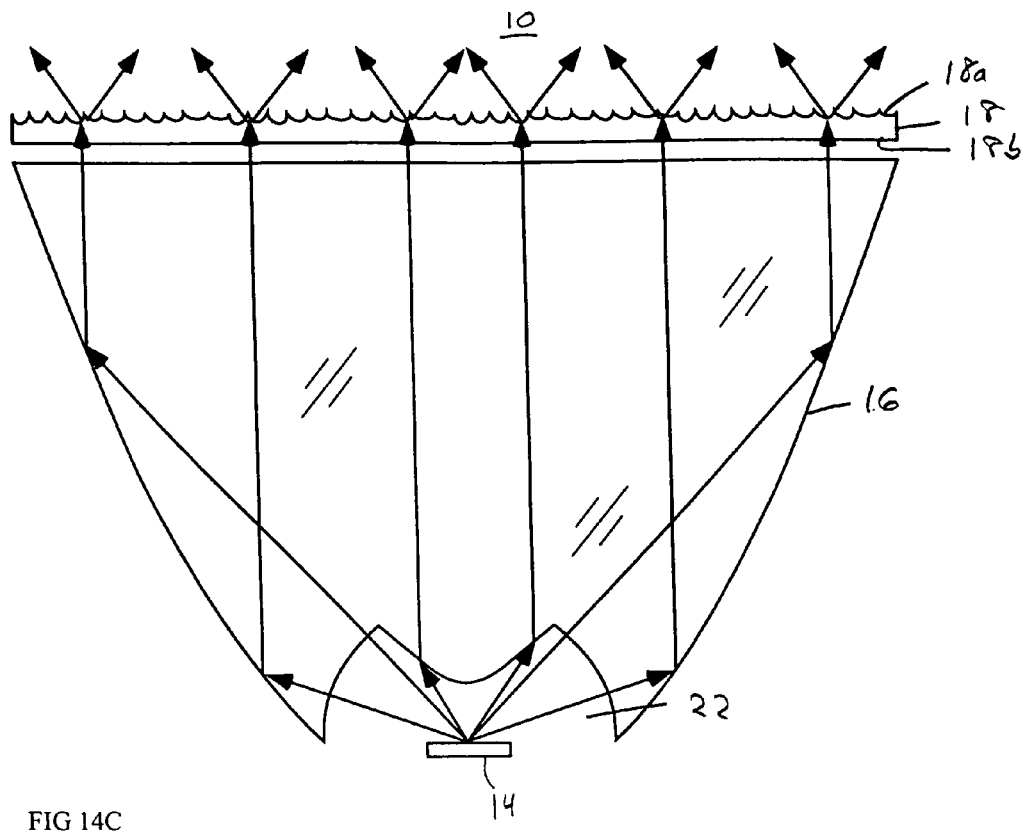

The diffuser 18 may be integrated into the top output surface 27 of the collimator 16 as shown in FIG. 14A to provide a collimator-diffuser assembly 17, or such integration may be along the top surface of collimator flange 32 of FIG. 6. Preferably, integration is by molding the light diffusing microlens surface 18 with the collimator 16. The diffuser 18 may also be a separate component, such as a plate, spaced from the collimator 16 as shown in FIGS. 14B and 14C. The diffuser 18 of FIG. 14B has a microlens array diffusing surface 18a that faces the collimator 16, and a flat surface 18b. In FIG. 14C, the microlens array diffusing surface 18a faces away from the collimator 16, and flat surface 18b faces the collimator. The diffuser 18 of FIG. 14B or 14C may be the same or different optical material than that of the collimator 16. In either of these three cases the diffuser redistributes the collimated light from the collimator 16 portion of the device into the desired light intensity distribution for which the diffuser is designed. Diffuser orientation of FIG. 14B is preferable as it can provide better performance than that of diffuser orientations of FIGS. 14A and 14C, especially for diffusing non-collimated light at large angles (±15°, or 30° total) at which TIR can occur at some rays at the diffusing surface of FIGS. 14A and 14C. Further, when an array 16 of collimator 16 is formed as a monolithic structure having common flange 32, as shown in FIG. 1, the diffuser 18 may be integrated directly along the top of the common flange along the array.

Figure 15A:
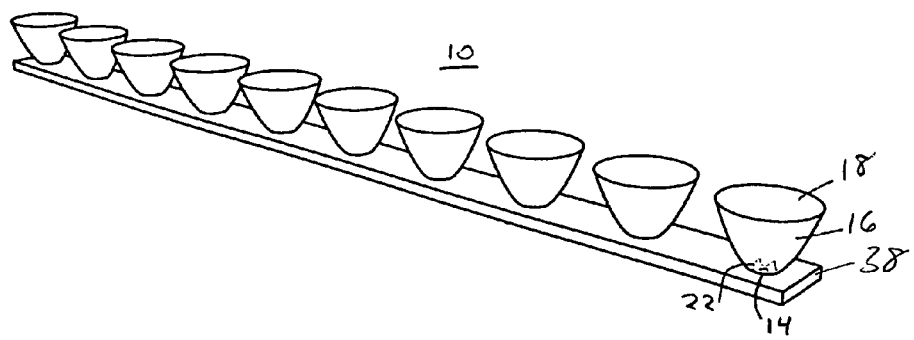
FIG. 15A is a perspective view of another example of the lighting device of the present invention having a one-dimensional array of collimator-diffuser assemblies as shown in FIG. 14A.
Figure 15B:
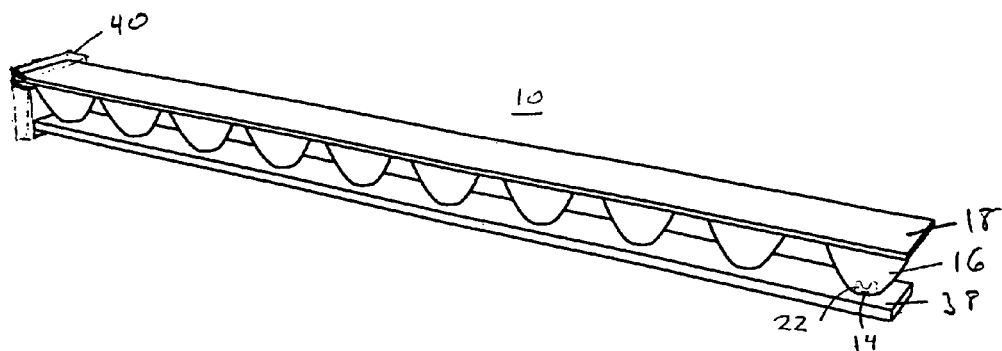
FIG. 15B is a similar perspective view of the lighting device of FIG. 15A in which the diffusers are part of a single structure.

For applications where a single source does not provide sufficient luminance, the lighting device 10 of the present invention can be implemented with multiple light sources in a variety of array configurations, one of which was shown earlier in FIG. 1. For a one-dimensional array of light sources, individual integrated collimator-diffuser assemblies 17 (FIG. 14A) are placed over each light source 14, as shown in FIG. 15A, or collimator-diffuser assemblies of FIG. 14B or 14C are used, as shown in FIG. 15B, in which adjacent collimators 16 are equally spaced from each other. The collimator 16 and diffuser 18 may be separate components with the diffuser as a single strip, plate, or sheet that is placed over the array of collimators 16, as shown in FIG. 15B. In the lighting devices of FIGS. 15A and 15B, the light sources 14 and collimators 16 are attached to a board or mounting fixture 38. To provide a housing for the lighting device 10 of FIG. 15B, two end caps 40 are each placed over one of the ends of the lighting device, where such end caps 40 each have a slot for receiving one end of diffuser 18. For purposes of illustration only one of the end caps 40 is shown. This configuration, like that of FIG. 1, has the advantage that the diffuser plate can be easily interchangeable based on the desired application and the required light distribution pattern. The collimators 16 of FIG. 15A or 15B may have such mounting means 34 or 36 to attach collimator end 16a to board 38 with their respective lighting source 14. For purposes of illustration, the recess 22 and light source 14 for only one of the collimators 16 is shown in dotted lines in FIGS. 15A and 15B. Two-dimensional arrays of collimator-diffuser assemblies of FIG. 14A, 14B, or 14C may similarly be formed along a board 38 with light sources 14.

Figure 16A:
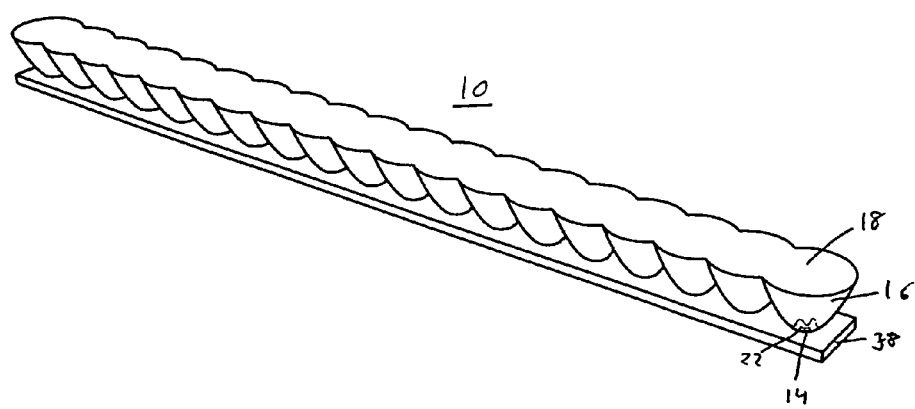
FIG. 16A is a similar perspective view of the lighting device of FIG. 15A having collimator-diffuser assemblies as shown in FIG. 14A to provide collimation in the cross axis direction and some collimation along the source axis.
Figure 16B:
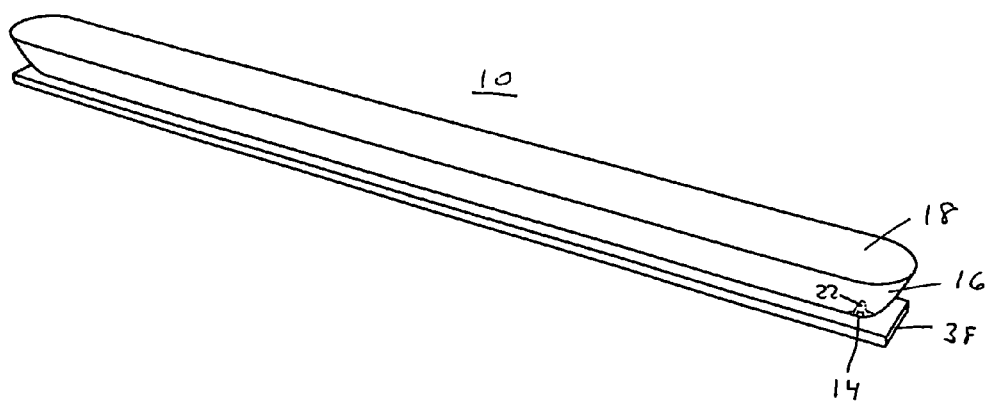
FIG. 16B is a perspective view of another example of the lighting device of the present invention having a one-dimensional array collimators that each linearly symmetric to provide collimation in the cross axis direction of the source array in which a diffuser integrated at the top surface of each collimator as illustrated in FIG. 14A.

In cases where the light sources 14 are closely spaced, the parabolic surface 24 of adjacent collimators 18 may merge partially together into a single monolithic structure, as shown in FIGS. 16A and 16B. Thus the best collimation perpendicular to the one-dimensional linear array is maintained while only slightly degrading the collimation along the array. The closer the light sources 14 are then the more the collimators 16 have to be merged or brought together thus reducing the amount of collimation in that direction.

When the light source spacing becomes too small to consider collimation along the axial direction of the array, the cross sectional profile of the collimator 16 in FIG. 3 can be formed, such as extruded, along the length of the array as shown in FIG. 16B forming a one-dimensional collimator 16 (with or without end caps). This configuration collimates the light sources in the direction perpendicular to the array axis and is suitable for use in applications such as hallway or path lighting in which the diffuser is responsible for tailoring the illumination in one direction. The collimator 16 of FIG. 16B is linearly symmetric, rather than rotationally symmetric as in other figures.

In two-dimensional arrangements of light sources that are spaced far enough apart, individual collimator-diffuser assemblies 17 are possible in hexagonal arrangements as shown in FIG. 17 or other configurations, such as square, rectangular, or generally random. Again, the diffuser 18 can be incorporated directly into the collimator 16. Optionally, the diffuser may be a single plate or sheet spaced from the top surface of the array of collimators 16 and retained in a housing adapted to receive the board 38, collimators attached thereto, and diffuser 18.

For more closely spaced light sources 14 the individual collimators 16 may be merged into a single two-dimensional structure to provide a collimator structure, such as shown in FIGS. 18A and 18B, to provide a continuous top surface onto which diffuser 18 is integrated. Although a polygon shaped configuration is shown, other configurations may be provided, such as square, rectangular, or generally random. The collimator structure and diffuser may be a molded assembly. This type of configuration reduces the amount of collimation that can be achieved and reduces the light-shaping performance of the diffuser. However, as with all the light devices 10 described herein, it remains highly efficient.

From the foregoing description, it will be apparent that there has been provided lighting devices using small light sources. Variations and modifications in the herein described lighting devices in accordance with the invention will undoubtedly suggest themselves to those skilled in the art. Accordingly, the foregoing description should be taken as illustrative and not in a limiting sense.

The invention claimed is:

1. A lighting device comprising:
   at least one source for providing light;
   at least one first optical element comprising a first end having a spherical first surface and a hyperbolic or elliptic second surface disposed centrally with respect to said spherical first surface, a parabolic outer third surface, and a second end, wherein said first, second, and third surfaces operate upon the light from said source received at said first end to provide light from said second end which is partially collimated; and
   at least one second optical element for diffusing light from said first optical element.

2. The lighting device according to claim 1 wherein said second optical element diffuses the light from said second end of said first optical element to provide substantially uniform light over an angular range.

3. The lighting device according to claim 1 wherein said second optical element has a microlens array structure to diffuse the light from said second end of said first optical element to provide light over an area.

4. The lighting device according to claim 3 wherein said microlens structure represents a randomized microlens array structure.

5. The lighting device according to claim 3 wherein said second optical element is a plate or sheet having a first surface having said microlens structure and a second surface.

6. The lighting device according to claim 5 wherein said first surface of the second optical element faces and receives light from said first optical element.

7. The lighting device according to claim 5 wherein said first surface of the second optical element faces away from said first optical element, and said second faces and receives light from said first optical element.

8. The lighting device according to claim 1 wherein said second optical element is integrated along a surface of said first optical element to enable said second optical element to diffuse the partially collimated light.

9. The lighting device according to claim 1 wherein said second optical element spaced from said first optical element.

10. The lighting device according to claim 1 wherein said light source is one of an LED, remotely illuminated optical fiber, halogen source, OLED, or laser.

11. The lighting device according to claim 1 further comprising:
    a plurality of ones of said light source;
    a plurality of ones of said first optical element arranged in an array to receive light from said plurality of ones of said light source; and
    said second optical element diffuses the light from said plurality of ones of said first optical element.

12. The lighting device according to claim 11 further comprising a plurality of ones of said second optical element each disposed for diffusing light from each one of said plurality of ones of said first optical element.

13. The lighting device according to claim 11 wherein said second optical element is sized to diffuse light received from said plurality of ones of said first optical element.

14. The lighting device according to claim 11 wherein said array is a two-dimensional array.

15. The lighting device according to claim 11 wherein said array is a one-dimensional array.

16. The lighting device according to claim 11 wherein said plurality of ones of said first optical element are formed in said array as a monolithic structure.

17. The lighting device according to claim 16 wherein said plurality of ones of said first optical element each have different ones of said second end for exiting said partially collimated light, and each of said plurality of ones of said first optical element has a flange connected to other of said plurality of ones of said first optical element to provide said monolithic structure.

18. The lighting device according to claim 16 wherein the parabolic outer third surface of said plurality of ones of said first optical element merge with each other to form said monolithic structure.

19. The lighting device according to claim 1 further comprising a housing having said light source, said first optical element, and said second optical element.

20. The lighting device according to claim 19 wherein said housing has a low profile.

21. The lighting device according to claim 1 wherein said partially collimated light from said first optical element provides substantially parallel light rays.

22. The lighting device according to claim 1 wherein said third surface internally reflects light received from said first surface as collimated light toward said second end, and light received by said second surface is collimated toward said second end.

23. The lighting device according to claim 22 wherein the light collimated by both said second surface and said third surface are substantially parallel to each other when exiting said second end of said first optical element to provide said at least partially collimated light.

24. The lighting device according to claim 1 wherein said first surface and said second surface are provided by a cavity at said first end into which light from said light source is received.

25. A lighting device comprising:
    at least one source for providing light;
    at least one first optical element for partially collimating light from said light source to provide an angular distribution intensity narrower than the light from said source, and said first optical element has a first end for receiving the light from said source and a second end outputting said partially collimated light; and
    at least one second optical element for diffusing light from said first optical element in which said second optical element has an optical diffusion property providing an angularly dependent output light intensity over an area in accordance with the angular distribution intensity of the partially collimated light from said first optical element to provide a redetermined illumination pattern, in which said angular distribution intensity has collimated light exiting said second end in an angular range to said second optical element, and said light from said second end is partially collimated to the extent that light from said first optical element is non-collimated outside said angular range to said second optical element, wherein first optical element comprises:

a parabolic rotationally symmetric body having said first end and said second end, in which said first end has a cavity having spherical sides, and a hyperbolic or elliptic center portion; and said body has a parabolic outer surface between said first and second ends for total internally reflecting light received via said spherical sides of said cavity as collimated light toward said second end, in which light received by said center portion is collimated toward said second end, in which the collimated light reflected by said outer surface toward said second end, and light collimated from said central portion toward said second end are substantially parallel to each other when exiting said second end.

26. The lighting device according to claim 25 wherein said center portion is hyperbolic shaped to provide a lens facing said light source.

27. The lighting device according to claim 25 wherein said center portion is elliptic shaped to provide a lens facing away from said light source.

28. The lighting device according to claim 25 wherein said light source is centered at the entrance of said cavity.

29. The lighting device according to claim 25 wherein said cavity is filled with a medium for mounting said light source to said first optical element.

30. The lighting device according to claim 25 wherein said body extends at said first end to provide a flat base.

31. The lighting device according to claim 25 wherein said body extends at said first end to provide a collar ring or one or more posts.

32. The lighting device according to claim 25 wherein said cavity is filled with a material having a lower refractive index than the material of said first optical element.

33. The lighting device according to claim 25 wherein said cavity is filled with a material having a higher refractive index than the material of said first optical element, and said central portion is elliptical.

34. A lighting device comprising:

at least one source for providing light;

at least one first optical element for partially collimating light from said light source to provide an angular distribution intensity narrower than the light from said source, and said first optical element has a first end for receiving the light from said source and a second end outputting said partially collimated light; and at least one second optical element for diffusing light from said first optical element in which said second optical element has an optical diffusion property providing an angularly dependent output light intensity over an area in accordance with the angular distribution intensity of the partially collimated light from said first optical element to provide a predetermined illumination pattern, in which said angular distribution intensity has collimated light exiting said second end in an angular range to said second optical element, and said light from said second end is partially collimated to the extent that light from said first optical element is non-collimated outside said angular range to said second optical element, wherein said first optical element comprises:

a parabolic linearly symmetric body having said first end and said second end, in which said first end has a cavity having spherical sides, and a hyperbolic or elliptic center portion; and said body has a parabolic outer surface between said first and second ends for total internally reflecting light received via said spherical sides of said cavity as collimated light toward said second end, in which light received by said center portion is collimated toward said second end, in which the collimated light reflected by said outer surface toward said second end, and light collimated from said central portion toward said second end are substantially parallel to each other when exiting said second end.

35. A collimating optical element comprising:

a body having a flat light exiting end, and a light entering end with a cavity having spherical sides, and a hyperbolic or elliptic center portion; and said body has a parabolic outer surface between said light exiting and light entering ends for total internally reflecting light received via said spherical sides of said cavity as collimated light toward said light exiting end, and light received by said center portion is collimated toward said light exiting end, in which the collimated light reflected by said outer surface toward said light exiting end, and light collimated from said central portion toward said light exiting end are substantially parallel to each other when exiting said light exiting end.

36. The collimating optical element according to claim 35 wherein said body is rotationally symmetric.

37. The collimating optical element according to claim 35 wherein said body is linearly symmetric.

38. A luminaire comprising:

a plurality of light sources;

an array of first optical elements each outputting light having an angular distribution intensity in response to light received from each one of said light sources, said angular distribution intensity being characterized by collimated light over an angular range and non-collimated light outside said angular range;

a second optical element for diffusing light from said array of first optical elements, in which said second optical element provides an angularly dependent output light intensity in accordance with the angular distribution intensity of said first optical elements to enable said second optical element to output a predetermined light pattern; and a housing having at least said array of first optical elements, and said second optical element, wherein each of said first optical elements comprise:

a body having a flat light exiting end, and a light entering end with a cavity having spherical sides, and a hyperbolic or elliptic center portion; and said body has a parabolic outer surface between said light exiting and light entering ends for total internally reflecting light received via said spherical sides of said cavity as collimated light toward said light exiting end, and light received by said center portion is collimated toward said light exiting end.

39. The luminare according to claim 38 wherein said housing is of a low profile.

40. The luminare according to claim 38 wherein said array represents one of a one or two-dimensional array.

41. The luminare according to claim 38 wherein said light sources are each one of an LED, remotely illuminated optical fiber, halogen source, OLED, or laser.

42. The luminare according to claim 38 wherein said second optical element is a plate or sheet having a surface with a microlens structure to provide said angularly dependent output light intensity in accordance with the angular distribution intensity of said first optical elements.

43. The luminaire according to claim 38 further comprising a plurality of ones of said second optical elements each capable of diffusing light to provide a different predetermined light pattern, and said plurality of ones of said second optical elements being interchangeable with each other in said housing.

44. The luminaire according to claim 38 wherein one or more of said first optical elements of said array are formed as a monolithic structure.

45. The lighting device according to claim 38 wherein the collimated light reflected by said outer surface toward said light exiting end, and light collimated from said central portion toward said light exiting end are substantially parallel to each other when exiting said light exiting end.

46. The luminaire according to claim 38 further comprising a board having said light sources each disposed to provide light to different ones of said first optical elements, and said housing further comprises said board.

47. The luminaire according to claim 38 wherein said angularly dependent output light intensity of said second optical element is complementary to said angular distribution intensity of first optical elements to provide a light pattern from said second optical element which is substantially uniform.

48. An optical element comprising a body having a first end with a spherical first surface and a hyperbolic or elliptic second surface disposed centrally with respect to said spherical first surface, a second end, and a parabolic outer third surface between said first and second ends, wherein said third surface internally reflects any light received from said first surface toward said second end and said second surface transmits any light received toward said second end to provide light exiting said body at said second end which is at least partially collimated when light is received at said first end by said first and second surfaces.

* * * * *